Figure 3:
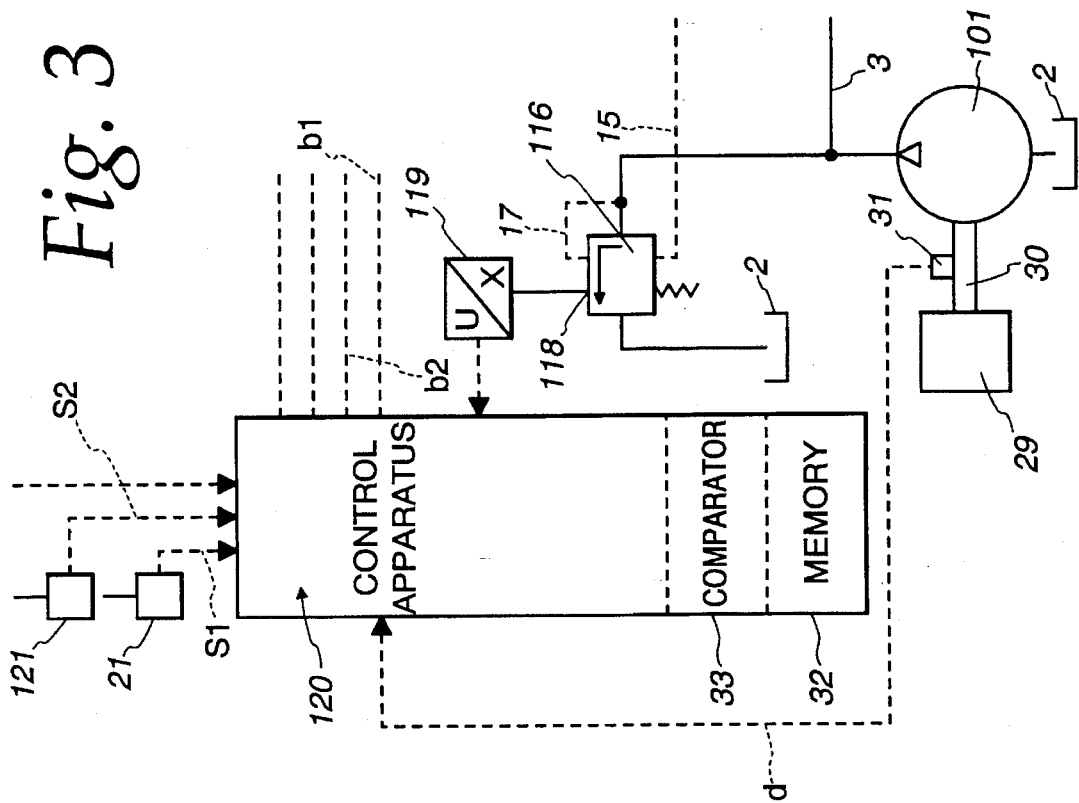

United States Patent [19]
Friedrichsen

[11] Patent Number: 5,493,861
[45] Date of Patent: Feb. 27, 1996

[54] HYDRAULIC SYSTEM WITH PUMP AND LOAD

[75] Inventor: Welm Friedrichsen, Nordborg, Denmark

[73] Assignee: Danfoss A/S, Nordborg, Denmark

[21] Appl. No.: 175,440

[22] PCT Filed: Jul. 7, 1992

[86] PCT No.: PCT/DK92/00218
§ 371 Date: Jan. 3, 1994
§ 102(e) Date: Jan. 3, 1994

[87] PCT Pub. No.: WO93/04290
PCT Pub. Date: Mar. 4, 1993

[30] Foreign Application Priority Data

Aug. 19, 1991 [DE] Germany ............ 41 27 342.7

[51] Int. Cl.⁶ ............................................. F16D 33/02
[52] U.S. Cl. ................................. 60/328; 60/452
[58] Field of Search ............... 60/420, 426, 452, 60/328

[56] References Cited

U.S. PATENT DOCUMENTS

| | | | |
|---|---|---|---|
| 4,738,102 | 4/1988 | Kropp | 60/452 |
| 4,870,819 | 10/1989 | Walzer | 60/445 |
| 4,967,554 | 11/1990 | Kauss | 60/452 |
| 4,967,557 | 11/1990 | Izumi et al. | 60/426 |
| 5,056,312 | 10/1991 | Hirata et al. | 60/426 |

*Primary Examiner*—F. Daniel Lopez
*Attorney, Agent, or Firm*—Lee, Mann, Smith, McWilliams, Sweeney & Ohlson

[57] ABSTRACT

In a hydraulic system with a pump (1) and a load (4, 104), a pressure relief valve (16) is connected to the pump pressure side (3) and open when a difference between pump pressure and maximum load pressure exceeds a predetermined pressure. Pump pressure is controlled by a pump controller (22), such that the pressure difference set by the pressure relief valve is greater than a pressure difference set by the pump controller. A controller (20) presets the pump delivery rate, depending on changes in input signals (s1, s2) and regulates the pump delivery rate in dependence on a pressure difference signal (U). The pressure relief valve includes a position sensor, which generates the pressure difference signal.

2 Claims, 2 Drawing Sheets

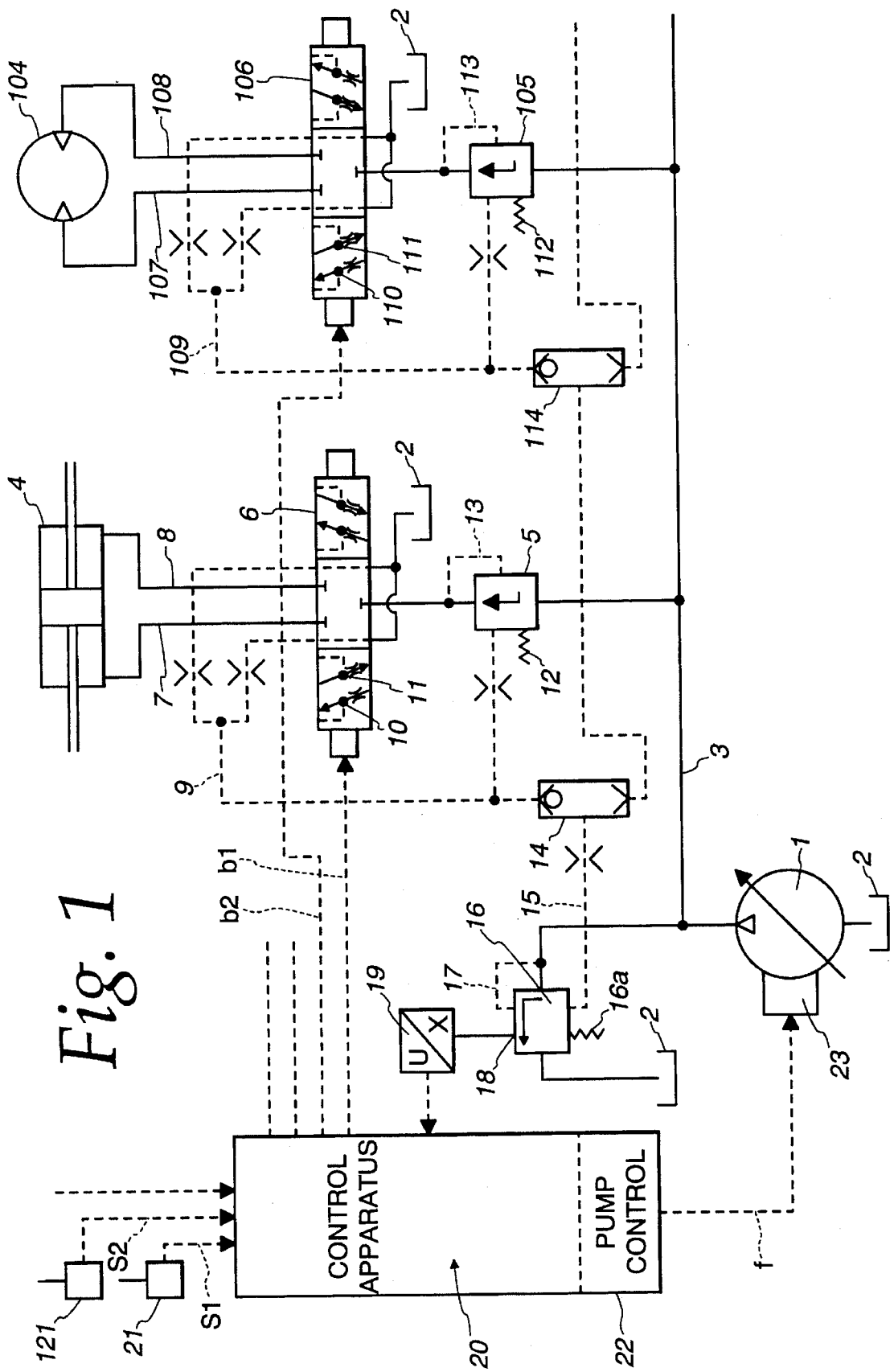

HYDRAULIC SYSTEM WITH PUMP AND LOAD

The invention relates to a hydraulic system with a pump and at least one load supplied by the pump.

A hydraulic system of that kind is known from DE-PS 25 14 624. There, the control valves are in the form of proportional valves, upstream of each of which there is connected a compensating valve which keeps the pressure drop at the proportional valve constant. The pump has a fixed delivery volume. The bleed valve returns an amount of fluid under pressure to the tank that is sufficiently large for the pump pressure to lie above the maximum load pressure by a predetermined pressure difference, which is preset by a spring acting on the slider of the bleed valve.

Instead of the pump with a fixed delivery rate and bleed valve, it is furthermore known (DE-OS 37 02 000) to provide a pump with a variable delivery rate which is adjusted with the help of a pump control device. This control device includes an electronic control apparatus which is supplied with position signals from the sliders of the compensation valves.

In a hydraulic system with a pump control device it is furthermore known (DE-OS 37 16 200) to use an electronic control apparatus supplied by setting devices with setting signals which, after electronic processing, are relayed as corrected setting signals to the proportional valves. If a further load is connected up with the help of a setting device, the control apparatus also ensures that the pump is correspondingly adjusted. In addition, if a desired value is specified, as a result of which the pump has to deliver more than the maximum delivery rate, the power demand of the load is moderated.

The invention is based on the problem of improving the operation of hydraulic systems. The basic concept of the invention consists in using the bleed valve in new functional relationships.

According to the invention, a pump control device is present, that is, a variable pump is provided. Such pressure control devices are, however, comparatively slow-acting. Sudden load pressure peaks, for example, when a load is suddenly switched off, have an effect throughout the entire hydraulic system. This disadvantage is prevented with the help of the bleed valve which in normal operation has no influence at all because it is closed as a consequence of the choice of its pressure difference in relation to the pressure difference of the pump control device, and only opens when the said pressure peaks occur. The slider of the bleed valve responds quickly so that the pressure peaks are not able to have an effect in the hydraulic system. This measure also does not require a large outlay, because in a conventional hydraulic system with a variable pump and a standard construction of the control valves, in particular of the proportional valves, only the bleed valve needs to be added.

The invention also is concerned with the problem of the slow response of the pump control device. Because the setting signals from the setting device appear before the control valves are actuated, the pump delivery rate is pre-adjusted in good time. This may, however, still be inaccurate. It therefore has superimposed on it a control based on the pressure difference signal which leads very quickly, namely, when the bleed valve has just closed, to the desired pump delivery rate.

According to one form of the invention which is suitable both for variable pumps and for fixed pumps, results in the hydraulic system being prevented in a simple manner from being overloaded. The pressure difference between the pump pressure and the maximum load pressure dependent on the bleed valve is in fact a measure of the loading on the system. If the pressure difference is compared with difference limits that are stored in the control apparatus, the loading limit zone is identified so that an overload protection is afforded by throttling the control valves.

The overload protection can be further improved by using other features of the invention, because the intensity of the throttling is matched from the start to the particular difference limits exceeded.

On account of the spring characteristic of the spring loading the slider of the bleed valve, the position of the slider is a direct measure of the pressure difference between pump pressure and maximum load pressure. Instead of a transducer, which measures the pressure difference and delivers it in the form of an electrical pressure difference signal to the control apparatus, according to the invention a position sensor can therefore be provided at the bleed valve, the position signal of which can likewise be evaluated as a pressure difference signal.

The development of the invention according to the invention serves for the overload protection of the drive motor of the pump. The limit loading is established at dropping of the rotational speed. In the case of a drive motor having a constant rotational speed, the rotational speed limit is fixed. In the case of a variable rotational speed pump, the rotational speed limit is dependent on the particular nominal rotational speed.

According to another form of the invention enables the throttling effect to be matched to the drop in rotational speed in a limit zone.

Normally, the required throttling is distributed by the control apparatus uniformly among the individual control valves that are in operation. According to the construction of the invention, however, priorities can also be set. This means that a major load is exempted completely from the throttling, or that the throttling effect is divided up into a predetermined ratio, for example 20% and 80% between a major load and a less important load.

Figure 2:
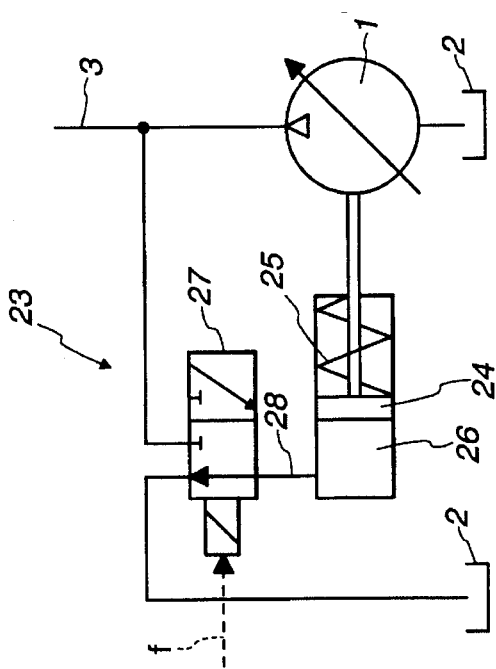

The invention is explained in detail hereinafter with reference to two embodiments illustrated in the drawings, in which FIG. 1 is the circuit diagram of a hydraulic system with a variable pump, FIG. 2 shows the setting device of the variable pump, and FIG. 3 is a component diagram of a hydraulic system, the pump of which has a constant delivery rate.

According to FIG. 1, a variable pump 1 conveys fluid under pressure from a tank 2 to the pressure line 3, by way of which several loads 4 and 104 are supplied. For that purpose, they are connected on the intake side by way of a compensation valve 5, 105 and a control valve 6, 106 in the form of a proportional valve and by way of one of two motor lines 7, 8 and 107, 108 to the pressure line 3, while the respective other motor line leads back by way of the control valve 6, 106 to the tank 2.

Each load has associated with it a load pressure sensor line 9, 109, the two branches of which are connected in the neutral position of the control valve to the tank 2, whereas in operation one of the branches is connected to a respective load pressure sensor point 10, 11, and 110, 111. The load pressure acts with a spring 12, 112 on the one pressure face of the slider of the compensation valve 5, 105, while the other pressure face is loaded by the pressure conveyed by way of the line 13, 113 upstream of the control valve 6, 106. The compensation valve ensures that the pressure drop in the control valve 6, 106 is constant on the intake side. Change-over valves 14, 114 ensure that in each case the maximum load pressure prevails in the sensor line section 15.

Attached to the pump line 3 is a bleed valve 16, the slider of which is loaded on one side by an adjustable spring 16a and the maximum load pressure in the sensor line section 15, and in the opposite direction is loaded by the pump pressure conveyed by way of the line section 17. The slider of the bleed valve 16 has associated with it a position sensor 18, the position signal X of which is converted in a transducer 19 into a pressure difference signal U.

The pressure difference signal U is supplied to an electronic control apparatus 20. When actuated, setting devices 21, 121 deliver setting signals s1, s2 to the control apparatus 20. This processes the individual signals and generates operating signals b1, b2 for displacing the control valves 6, 106. In addition, the control apparatus 20 contains a pump control device 22, which delivers control signals f to a setting device 23 of the variable pump 1. The control apparatus 20 processes the incoming signals in order in dependence thereon to operate the control valves and the pump.

The setting device 23 of the pump 1 can be, for example, in the form illustrated in FIG. 2. An adjusting piston 24 for adjusting the pump stroke is loaded at one side by a spring 25 and at the other side by the pressure in the cylinder chamber 26. This pressure is determined by the control signal f which acts on an electromagnetic control valve 27, the take-off point 28 of which carries a pressure between the pressure of the pump line 3 and the tank pressure.

If, for example, the setting device 21 is operated in order to adjust the axial piston motor 4, the setting signal s1 initiates in the control apparatus 20 first of all an associated presetting off the variable pump 1. An operating signal b1 is also transmitted to the control valve 6. Because the pump 1 has been acted upon in good time, despite its inertia it is able to approximate to the desired position parallel with the actuation of the control valve 6. The bleed valve 16 is then under the influence of the pressure difference between pump pressure and load pressure of the axial piston motor 4. It assumes an appropriate position. The position sensor 18 gives a corresponding pressure difference signal U. If this does not correspond to the desired value, the pump control device 22 performs a corresponding readjustment. This provides for a very accurate operation.

The pressure difference in particular, at which the bleed valve 16 opens and which is set by the spring 17, should be slightly larger than the pressure difference for which the pump control device 22 is preset. For normal operation this means that the bleed valve 16 is closed and has no influence on the system. If, however, a sudden increase in the pressure difference occurs, for example because the load has suddenly been switched off or has reached an end stop, corresponding pressure difference peaks are moderated by opening the bleed valve 16 so that they are not able to cause any damage.

In the modified form according to FIG. 3, a pump 101 with a fixed delivery rate is used. It is driven by a drive motor 29 by way of a shaft 30 which has associated with it a tachometer 31 which delivers the actual rotational speed d to the control apparatus 120. A bleed valve 116 is connected to the pump line 3 in the same way as in the preceding embodiment. Associated with the valve slider there is a position sensor 118 which delivers a position signal X representing the pressure difference between the pump pressure and the load pressure to the transducer 119, which in its turn supplies the control apparatus 120 with a corresponding pressure difference signal U. The remaining construction of the circuit corresponds to that of FIG. 1.

The control apparatus 120 has a memory 32 containing pressure difference limits and rotational speed limits that are characteristic of a limit of loading of the hydraulic system and of the drive, respectively. These limits can be predetermined by the manufacturer of the system or can be set by the user on the basis of a few tests.

To safeguard the hydraulic system from overload, the pressure difference signal U characterizing the actual loading is compared in a comparator 33 with a stored pressure difference limit. The control apparatus throttles the volume flow with the help of control valves so that the actual pressure difference remains within the range of the pressure difference limit. In order to be able to perform the desired throttling as quickly as possible, a limit zone with several limits ranked according to magnitude can be provided; as these limits are reached the control apparatus effects an increasingly intense throttling.

If it is desired to protect the drive motor of the pump, then the rotational speed signal d is compared in the comparator 33 with a stored rotational speed limit. If the loading is too great, the control apparatus 120 changes the operating signals b1, b2 in a similar manner to that described above so that the rotational speed remains within the predetermined limit zone.

The control apparatus 20, 120 also enables differential throttling of the control valves 6, 106 to be performed. Thus, in a preferred load the throttling can be suppressed and the entire throttling effect can be spread over the other control valves. It is also possible to throttle one control valve strongly and the other control valve weakly, for example in a ratio of 80%/20%.

The embodiments illustrated can be modified in many ways, without departing from the basic concept of the invention. For example, a pump with a variable rotational speed motor can be used as the variable pump. In that case, is it expedient to record the rotational speed at the control apparatus 20 with the help of a tachometer. Instead of the compensation valves 5, 105, a family of characteristics can also be stored in the control apparatus 20 which, in dependence on the widely differing operating data, ensures that the control valves 6, 106 operate as proportional valves.

I claim:

1. In hydraulic system with
   a) a pump,
   b) at least one load supplied by the pump,
   c) at least one control valve between the pump and each load,
   d) at least one setting device for operation of each control valve,
   e) a device for establishing a maximum load pressure,
   f) a bleed valve which is connected at a pump line and opens towards a tank when a predetermined pressure difference between pump pressure and the maximum load pressure is exceeded,
   g) a pump control device including means to set a predetermined pressure difference between pump pressure and maximum load pressure,
   h) wherein the predetermined pressure difference at the bleed valve is larger than the predetermined pressure difference at the pump control device, the improvement comprising
   i) a control apparatus having means for operating each control valve in dependence on setting signals generated by each setting device, and j) a single transducer connected to the bleed valve and including means to convert an actual pressure difference between pump pressure and maximum load pressure into a pressure difference signal to be supplied to the control apparatus, k) wherein the control apparatus presets a pump delivery rate in dependence on each change in the setting signals and controls the pump delivery rate in dependence on the pressure difference signal.

2. A hydraulic system according to claim 1, in which the bleed valve has associated with it a position sensor which determines the position of a slider of the bleed valve, and a position signal delivered by the position sensor is arranged to be supplied to a transducer for output of the pressure difference signal.

* * * * *